Aug. 30, 1955 N. S. FOCHT 2,716,470
SHOCK ABSORBERS
Filed Jan. 24, 1951 2 Sheets-Sheet 1

INVENTOR.
Nevin S. Focht
BY
ATTORNEY.

Aug. 30, 1955 N. S. FOCHT 2,716,470
SHOCK ABSORBERS

Filed Jan. 24, 1951 2 Sheets-Sheet 2

INVENTOR.
Nevin S. Focht
BY
*James J. Kennedy*
ATTORNEY

United States Patent Office 2,716,470
Patented Aug. 30, 1955

2,716,470

SHOCK ABSORBERS

Nevin S. Focht, Garden City, N. Y.

Application January 24, 1951, Serial No. 207,474

11 Claims. (Cl. 188—96)

This invention relates to improvements in shock absorbers.

In my application Serial No. 179,567 filed August 15, 1950 for Shock Absorbers, I have disclosed a shock absorber intended primarily for use in vehicles. In such use a variety of amplitudes and frequencies must be handled, and the best practice is to impose little or no hydraulic restraint upon high frequency small amplitude vibrations, as such vibrations may be absorbed in the vehicle spring suspension and will not be communicated to any objectionable degree to the sprung mass by reason of its inertia and slow natural periods of vibration.

The present invention is directed to improvements and adaptations of the mechanism disclosed in my said application and is concerned with devices which are typically designed to absorb high frequency vibrations while permitting large amplitude and low frequency movements. Typical uses for such mechanism are in the prevention of shimmy in a vehicle wheel or flutter in an aircraft control surface or other adjustable element.

It is an object of the invention to provide a device of the character indicated, having improved frequency characteristics.

It is a further object of the invention to provide a device of the character indicated which is simple and rugged in construction and requires the minimum of servicing.

With the foregoing and still other objects which will appear in the following full description in mind, the invention consists in the combinations and arrangements of parts and details of construction which will now first be fully described with reference to the accompanying drawing and then be more particularly pointed out in the appended claims.

Figure 1:
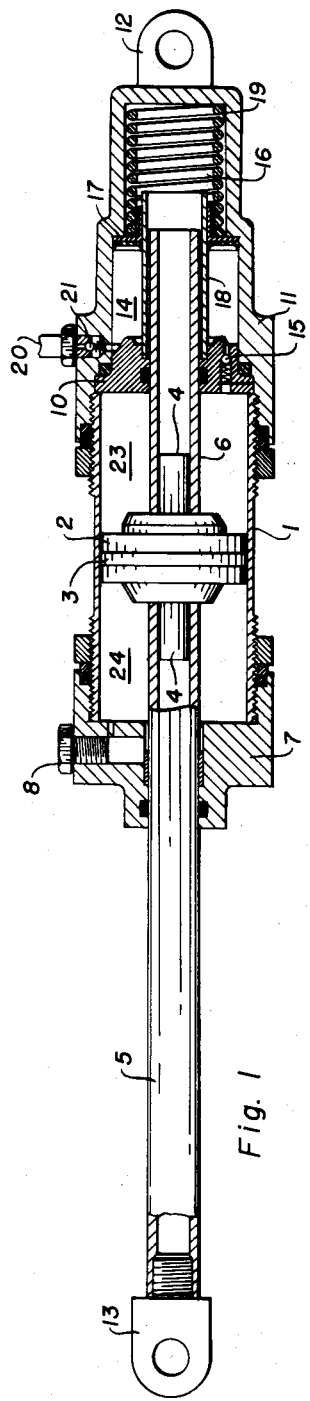
Figure 1 is a view in central longitudinal section of a flutter damper embodying the invention in a preferred form of embodiment.
Figure 2:
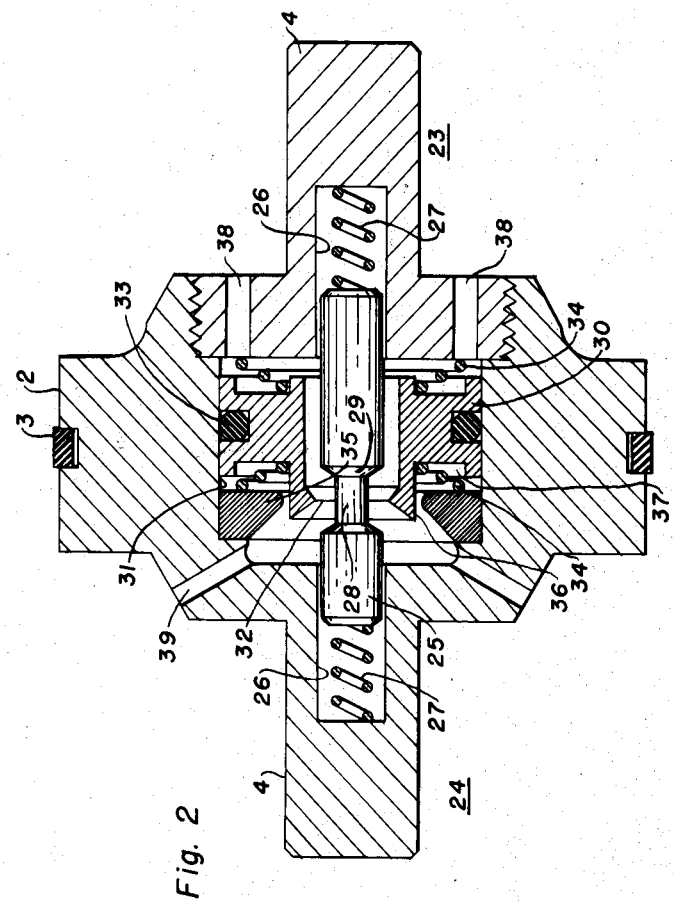
Figure 2 is an enlarged view showing the piston and valving structure of the flutter damper of Figure 1.

Referring first to the embodiment of Figures 1 and 2, the flutter damper comprises a cylinder 1, cooperating piston 2 which reciprocates within the cylinder and may be equipped with a suitable piston ring 3 to reduce or prevent leakage between piston and cylinder. The body of the piston 2 is formed with cylindrical projections 4 which are fastened in the tubular piston rod sections 5 and 6. A head 7 is provided at one end of the cylinder 1 and may be equipped with a plug 8 for bleeding oil or air. The other end of the cylinder is closed off by a head body 10 held in position by a cap 11. End fittings 12 and 13 provide for attaching the cylinder end and piston rod respectively to a frame member and to a part whose flutter or vibration is to be prevented. This part may be a horn of an aileron or other pivotally mounted member or may be in the control cable or the like. The inside of the cap 11 forms an oil reservoir 14 communicating with a space within the cylinder 1 through a check valve 15. A spring 16 urges a piston member 17 surrounding a tube 18 inwardly for maintaining pressure in the space 14 and for preventing the oil from passing through into the housing 19 enclosing the spring 16. A fitting 20 may be connected to an oil line under pressure for supplying oil to the reservoir 14 through check valve 21. Movement of the cylinder 1 and piston 2 in either direction with respect to each other will force the oil or other hydraulic fluid from the space 23 on one side of the piston into the space 24 on the other or vice versa, this flow going through the passages shown in Figure 2 and now about to be described.

A metering pin 25 is mounted in a pair of aligned bores 26 and normally held in the center position of the figure by a pair of springs 27. This metering pin has a narrow neck 28 and tapers outwardly at either side thereof as indicated at 29. A body 30 reciprocable in a bore 31 in the body of the piston 2 carries an orifice 32 surrounding the metering pin as shown. The body 30 is sealed to the bore 31 as by means of O-ring 33 and is normally held in the center position of the figures by a pair of springs 34. An annular washer 35 surrounds a tubular part 36 of the body 30, forming a dash pot space 37. Oil enters and leaves the spaces within the piston body 2 through the channels 38 and 39 connecting to the working spaces 23 and 24.

Where the flutter damper is subjected to a low frequency large amplitude movement, as in the case of an adjustment of a control surface, practically no resistance is offered. This results from the fact that in the centered position of Figure 2 the opening between orifice plate 35 and the metering pin neck 28 is at its maximum and only a slight pressure drop will be created by the relatively slow movement of oil through this space. In consequence, the orifice plate will not move substantially along the metering pin in either direction.

However, a rapid movement or attempted movement when communicated to the device will tend to cause a high speed flow of oil through the orifice around the metering pin and thus create a substantial pressure drop. Assuming for purposes of illustration that the piston 2 is moving to the right within the cylinder, the pressure within working space 23 will thus be increased relative to that within working space 24. Accordingly, the orifice body 30 will be moved to the left until the orifice comes to the left taper 29 of the metering pin and closes down the flow area. Since the oil must flow out of the hydraulic space 37 through the opening between the orifice plate 35 and tubular section 36 of the orifice body, the rate at which the orifice body moves is controlled, with space 37 acting as a dash pot, and a too rapid response and tendency toward oscillation of the orifice body are prevented. When the applied force is reversed it tends to drive the orifice body in the opposite direction, first opening up the orifice around the metering pin and then closing it down again. The device is capable of operation as a high frequency cut off damper or filter, with the cut off value being determined by the relation between the orifices around the metering pin, the diameter of the bore 31 and the opening between the tubular section 36 and orifice plate 35 as related to each other and with the area of the main cylinder 1.

The metering pin 25 fits somewhat loosely in the bores 26 so as to permit restricted flow of oil into and out of these bores around the metering pin. The bores thus serve as dash pots controlling the metering pin movement.

Assuming the orifice body to have moved over (to the left, for example) to or beyond the taper 29, the higher pressure on one side of the orifice (to the right, for example) will tend to drive the metering pin in the same direction as the orifice body has already moved. Thus, should the pressure rise to a higher value than is desired, the metering pin 25 will follow the orifice body's movement, thus again opening up the flow orifice for the oil around the metering pin and preventing the pressure in the cylinder 1 from exceeding a safe value.

Figure 3:
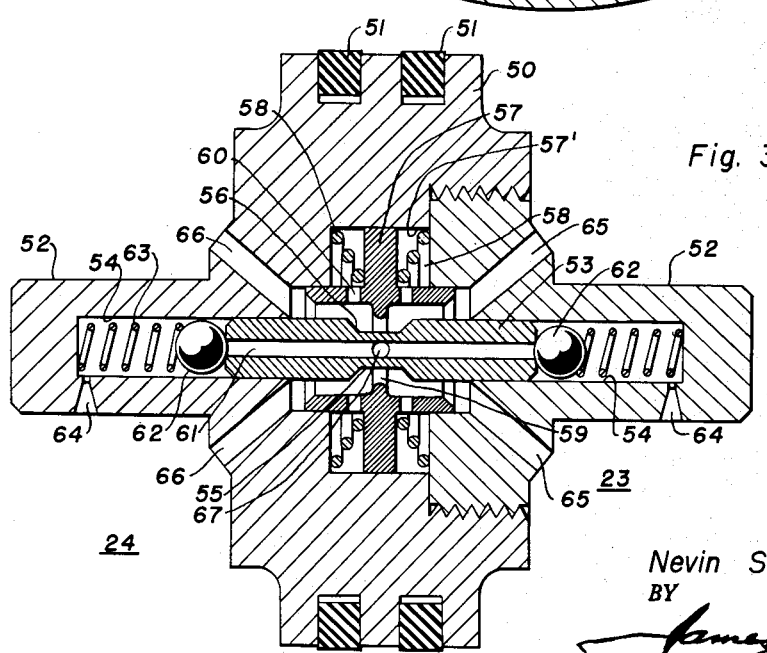
Figure 3 is a view similar to Figure 2, but showing a modified form of the device.

Figure 3 illustrates a modification in the metering valve structure. It will be understood that the cylinder and piston rod arrangement may be the same as that used in connection with the embodiment of Figure 2 and hence only the piston structure is shown. The piston 50 is equipped with piston rings 51 for sealing to the cylinder and with cylindrical projections 52 for fastening in the piston rod sections 5 and 6 as before. The metering pin 53 is reciprocably carried in bores 54 and has a narrow neck 55 with tapered enlargements 56 at either side thereof. A cooperating orifice member 57 reciprocates in a cylinder bore 57', being centered therein by springs 58 and has an orifice or opening 59 cooperating with the metering pin 53. Orifices 60 provide for flow into and out of the dash pot cylinder as the orifice body moves therein. The metering pin 53 has a central bore 61 whose ends are normally closed off by balls 62 pressed against the ends of the metering pin by springs 63. Orifices 64 provide for flow into and out of the bores 54 from the spaces 23 and 24. It will be understood that the piston rod sections 5 and 6 are also bored through in alignment with the orifices 64. Channels 65 and 66 provide for flow to and from the main cylinder working spaces. A cross bore 67 establishes communication between the metering pin bore 61 and the space surrounding the metering pin.

The operation of the device of Figure 3 is similar in many respects to that of the device of Figure 2. Thus, a large amplitude relatively slow movement, such as is involved in adjusting the position of a control surface or steering movement, will not be impeded since the pressure drop due to the oil flow through the orifice around the metering pin will be insufficient to move the orifice body substantially. Forces applied to the piston tending to cause more rapid oil flow will create a pressure difference as before, driving the orifice body 57 in one direction or the other and closing down the opening for flow between opening 59 and the metering pin. The rate of movement of the orifice member 57 is controlled by the dash pot action of the oil flowing into and out of openings 60. At the same time the pressure within working spaces 23 and 24 is communicated through orifices 64 to the two ends of the metering pin within the bores 54, tending to drive the metering pin in a direction to follow the orifice member 57 and thus tending to open up the area for flow around the metering pin. The rate of movement of the metering pin, however, will normally be much slower than that of the orifice member 57, due to the lesser area within the bores 54 as compared to that within bore 57' and due to the restraint of flow imposed by the orifices 64. Assuming that the orifice body is moved to the left in the figure, it will be apparent that the cross bore opening 67 will communicate with the high pressure side of the orifice opening around the metering pin, so that the pressure in the high pressure working space 23 will be applied to the ball 62 at the left end of the metering pin in the figure. Should this pressure tend to exceed a predetermined value, this ball 62 will lift against the spring 63 admitting oil from the high pressure space 23 into the bore 54 in back of the metering pin and raising the pressure within this space. This slows down or checks the movement of the metering pin. The spring stiffness, piston areas and orifice areas may readily be selected to meet almost any desired condition. Thus, the orifice body and metering pin systems may have time constants of a different order of magnitude if the movement of the orifice body be more rapid. The result is to introduce non-linearity and lack of symmetry in the orifice variation due to an applied oscillatory force, producing an ideal condition for damping all undesired vibrations. Secondly, any undesirable effects at specific frequencies, corresponding to natural frequencies of the orifice body or metering pin or two harmonics thereof are avoided, as the movement of the metering pin tends to destroy any tendency toward oscillation in the orifice body system and vice versa.

Figure 4:
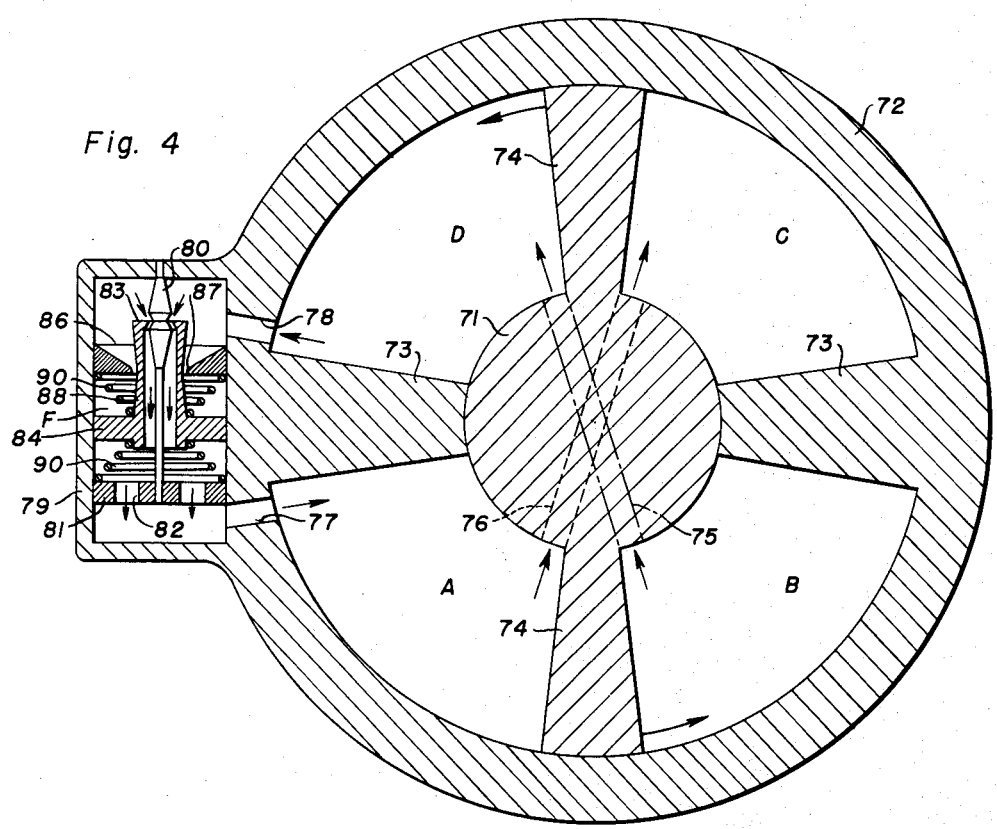
Figure 4 is a cross sectional view of an anti shimmy device embodying the invention in a preferred form.

In the embodiment of Figure 4 of the drawing, the invention is shown as applied to a rotary dash pot or hydraulic shock absorber. Such a device may be employed similarly to a shock absorber of the reciprocating piston type by means of a suitable crank connection or linkage, but is primarily intended for damping a rotary movement. A typical application of the device disclosed is in the prevention of shimmy of a wheel, such as the nose wheel of an aircraft which has a tendency to oscillate about a generally vertical axis on which it is mounted to permit turning of the aircraft when travelling over the ground in landing or taking off.

The rotor 71 and housing 72 are connected in any suitable and desired manner to the wheel mounting and to the frame. The housing 72 has a pair of partitions 73 finished with cylindrical surfaces conforming to the cylindrical body of the rotor and fitting so as to permit free rotation of the rotor but preventing any excess leakage from one side of a partition 73 to the other. The rotor is similarly provided with a pair of vanes 74, the cylindrical outer ends of which fit the cylindrical inner wall of the casing 72 closely enough to prevent undue leakage from one side of a vane to the other. The partitions 73 and vanes 74 divide the interior of the cylinder into four hydraulic working spaces A, B, C and D. Working space B is connected to working space D by a channel 75 through the rotor body and working space A is similarly connected to working space C through a channel 76 in the rotor body. The arrows in the figure indicate the direction of fluid flow for a counterclockwise movement of the rotor and the circulation of the hydraulic fluid, typically oil, for a movement of the rotor in the opposite direction will be exactly the reverse. The spaces A and D communicate through passages 77 and 78 with the two ends of a metering valve cylinder 79 attached to the working cylinder 72. The metering valve comprises a metering pin 80 fixedly mounted in the casing. One end of the metering pin is supported in the end wall of the cylinder 79 itself and the other end is supported in a plate 81 fixed within the cylinder and having openings 82 for permitting fluid flow. The orifice plate 83 is carried on a piston 84 reciprocable in the cylinder 79. An annular plate 86 is fixed in the metering valve cylinder 79 and has a central opening 87 surrounding the tubular section 88 which connects the orifice plate 83 to the piston 84. A pair of springs 90 serve to return the orifice plate to the position of the figure, when hydraulic pressure in one direction or the other is relieved. The metering pin has a narrow section within the orifice plate 83, tapers outwardly in both directions from this narrow section and then gradually tapers inwardly, as shown. In consequence, the flow orifice through plate 83 and around the metering pin 80 will be at a maximum with the parts in the position of the figure, and will be reduced as the orifice plate moves in either direction along the metering pin. Excess movement will again increase the flow area, preventing excessive strain on the parts. The tubular section 88 likewise has its smallest outside diameter in alignment with the opening 87 in the position of the figure and tapers outwardly in both directions, so that, as the piston 84 moves in either direction, the flow area between the tubular section 88 and the annular plate 86 is reduced.

Assuming that a force tending to rotate the rotor counterclockwise is applied to the device, an oil flow in the direction of the arrows will be created. Both of the chambers B and D decrease in volume so that oil is forced therefrom through the passage 78, through the orifice between the metering pin 80 and the orifice plate 83 and thence through passage 77 into chambers A and C which are increasing in volume at the same rate as chambers B and D are decreasing in volume. The pressure drop through the orifice around the metering pin tends to drive the orifice plate and piston 84 to which it is attached downwardly in the figure, or toward the passage 77, thereby reducing the flow area around the metering pin. This movement, however, is opposed by a dash pot effect since the hydraulic space F between the piston 84 and plate 86 must fill with oil through the orifice between this plate and the tubular section 88. Due to the taper of section 88, the resistance to flow through this opening increases as the piston moves from the position of the figure. A force tending to move the rotor 71 in the opposite direction will cause a circulation of oil in the opposite direction and will drive the piston 84 toward the passage 78. In this movement, the oil within space F must again pass through the orifice between the plate 86 and the tubular section 88, again checking or regulating the rate of movement of the orifice plate relative to the metering pin. By a suitable selection of metering pin and orifice size, the device may readily be arranged so as to oppose substantially no resistance to a slight turning movement of the wheel, as is involved in steering. Under these conditions, the pressure drop in passing through the orifice around the metering pin will be insufficient to move the orifice plate against centering springs 90.

What is claimed is:

1. In a hydraulic shock absorber, a piston and cooperating cylinder, the piston having a rod passing through both ends of the cylinder, a reservoir for hydraulic fluid at one end of the cylinder and surrounding the piston rod, means sealing the reservoir to keep hydraulic fluid therein away from the end of the rod, a fluid passage connecting the reservoir and cylinder including a check valve for admitting fluid from the reservoir to the cylinder, a connection for supplying fluid under pressure to the reservoir, and a fluid passage from said connection to the reservoir including a check valve preventing flow out of the reservoir into the said supply connection.

2. A shock absorber according to claim 1, comprising also piston means for varying the volume of the reservoir and yielding means for urging the piston means in a direction to apply pressure to fluid in the reservoir.

3. In a hydraulic shock absorber, a piston and cooperating cylinder, the piston having a rod passing through both heads of the cylinder, an annular reservoir for hydraulic fluid including a tubular wall surrounding one end of the piston rod, a fluid passage connecting the reservoir and cylinder including a check valve for admitting fluid from the reservoir to the cylinder, an annular piston slidable on the tubular wall and yieldable means for moving the annular piston in a direction to reduce the reservoir volume.

4. A hydraulic shock absorber comprising a double acting piston and cylinder having equal displacement areas on the two sides of the piston, valve means connecting the two ends of the cylinder and comprising an orifice varying element, means for applying the pressures at the two ends of the cylinder thereto for moving the element according to the pressure difference across the piston, spring means for centering the orifice varying element in a position of maximum orifice flow area, and a dash pot comprising relatively movable piston and cylinder elements, one attached to the orifice varying element and the other to the relatively stationary element and resisting movement of the one said orifice varying element.

5. A hydraulic shock absorber comprising a double acting piston and cylinder having equal displacement areas on the two sides of the piston, valve means connecting the two ends of the cylinder and comprising two relatively movable orifice varying elements, means for applying the pressures at the two ends of the cylinder to one said element for moving the same according to the pressure difference across the piston, spring means for centering the said element in a position of maximum orifice flow area, a dash pot comprising relatively movable piston and cylinder elements connected respectively to the said two orifice varying elements and resisting movement of the one said orifice varying element, means for also applying the cylinder pressures to the other said element for varying the orifice oppositely to the first said element and centering spring means for the said second said element arranged for normally holding the same in centered position but permitting movement thereof by pressure difference exceeding a predetermined value.

6. A shock absorber according to claim 5, comprising also a dash pot resisting movement of the second said orifice varying element, the last said dash pot comprising relatively movable piston and cylinder elements connected respectively to the said second orifice varying element and to the relatively stationary element.

7. A metering valve for shock absorbers comprising a body having an internal cylinder bore and aligned smaller bores continuing and extending beyond the ends thereof, a metering pin reciprocable in the two said smaller bores and an annular piston element reciprocable in the first said bore and having an orifice cooperating with the metering pin, the body having channels for conducting fluid to and from the two ends of the first said bore.

8. A metering valve according to claim 7, comprising also springs in the said bores for centering the metering pin and piston element.

9. A metering valve according to claim 8, comprising also means restricting flow to and from a space swept by the piston element to regulate speed of movement thereof.

10. A metering valve according to claim 9, comprising also means restricting flow to and from the two said smaller bores to regulate speed of movement of the metering pin.

11. A metering valve according to claim 8, in which the metering pin has a central longitudinal channel and an opening therefrom into the interior of the annular piston element, and comprising ball checks at the ends of the channel and yieldably held thereagainst by the springs in the bores.

References Cited in the file of this patent

UNITED STATES PATENTS

| | | |
|---|---|---|
| 1,745,357 | Crowell | Feb. 4, 1930 |
| 1,780,531 | Messier | Nov. 4, 1930 |
| 1,818,773 | Westman et al. | Aug. 11, 1931 |
| 1,926,260 | Broulhiet | Sept. 12, 1933 |
| 2,060,554 | Chryst | Nov. 10, 1936 |
| 2,235,488 | Mercier | Mar. 18, 1941 |
| 2,342,381 | Thornhill | Feb. 22, 1944 |
| 2,409,349 | Focht | Oct. 15, 1946 |
| 2,410,176 | Magrum | Oct. 29, 1946 |
| 2,537,491 | Thornhill | Jan. 9, 1951 |
| 2,607,443 | Mayo et al. | Aug. 19, 1952 |
| 2,630,193 | Funkhouser | Mar. 3, 1953 |

FOREIGN PATENTS

| | | |
|---|---|---|
| 519,312 | Great Britain | Mar. 21, 1940 |
| 922,638 | France | June 13, 1947 |
| 232,146 | Germany | Mar. 13, 1911 |